United States Patent [19]

Pawar

[11] Patent Number: 4,871,795

[45] Date of Patent: Oct. 3, 1989

[54] FLAME RETARDANT ADDITIVE FOR THERMOPLASTICS

[76] Inventor: Prakash K. Pawar, 3 Clove Ct., Clifton Park, N.Y. 12065

[21] Appl. No.: 224,183

[22] Filed: Jul. 22, 1988

Related U.S. Application Data

[63] Continuation of Ser. No. 45,104, May 1, 1987, abandoned.

[51] Int. Cl.$^4$ .............................................. C08K 3/32
[52] U.S. Cl. .................... 524/267; 252/609; 523/179; 524/268; 524/387; 524/388; 524/415; 524/416
[58] Field of Search ............... 524/267, 268, 387, 388, 524/415, 416; 252/609; 523/179

[56] References Cited

U.S. PATENT DOCUMENTS

| | | | |
|---|---|---|---|
| 3,185,733 | 5/1965 | Nielsen | 524/415 |
| 3,216,968 | 11/1965 | Monroe | 524/415 |
| 3,562,197 | 2/1971 | Sears et al. | 524/415 |
| 3,562,968 | 2/1971 | Sears et al. | 524/415 |
| 3,936,416 | 2/1976 | Brady | 524/387 |
| 3,971,756 | 7/1976 | Bialous et al. | 524/267 |
| 4,009,137 | 2/1977 | Dany et al. | 524/415 |
| 4,072,651 | 2/1978 | Lawson | 524/415 |
| 4,115,351 | 9/1978 | Joh | 524/416 |
| 4,366,276 | 12/1982 | Freitag et al. | 524/417 |
| 4,371,653 | 2/1983 | Betts et al. | 524/268 |
| 4,387,176 | 6/1983 | Frye | 524/268 |
| 4,536,529 | 8/1985 | Frye et al. | 524/268 |
| 4,542,170 | 9/1985 | Hall | 523/179 |
| 4,731,406 | 3/1988 | Itoh et al. | 524/436 |

Primary Examiner—Veronica P. Hoke

[57] ABSTRACT

There is provided a flame retardant for thermoplastic resins comprising
(i) 20 to 60% by weight a silicone oil;
(ii) 10 to 40% by weight a silicone resin;
(iii) 5 to 60% by weight a gassing agent selected from the group consisting of compounds containing both phosphorus and nitrogen or a mixture of phosphorus containing compounds with nitrogen containing compounds and
(iv) a polyhydric alcohol in a weight ratio to said gassing agent ranging from about 1/9 to about 1/5.

24 Claims, No Drawings

FLAME RETARDANT ADDITIVE FOR THERMOPLASTICS

This application is a continuation of application Ser. No. 045,104 filed 05/01/87 now abandoned.

The present invention relates to flame retardant additives and particularly such additives for thermoplastics. More particularly, the present invention relates to silicone based flame retardant additives for thermoplastics including polyolefins.

BACKGROUND OF THE INVENTION

Considerable efforts have been expanded in the past to flame retard thermoplastic resin without the use of halogen. Typically, it has been necessary to heavily fill the plastic or thermoplastic material with additives until the desired degree of flame retardancy is achieved. Heavy filling offers several disadvantages due to the fact that a large proportion of additives can normally be expected to detract from the physical properties of the plastic material. Further, the additive may bring complications inherent to the additive itself, such as, for example, foaming, which must be dealt with an addition to a general lessening of physical properties.

The present invention provides flame retardant additives which not only provide improved flame retardance in the absence of organic halides, but also do not exhibit poor processability as might be expected from the prior art.

U.S. Pat. No. 4,387,176, assigned to the instant assignee, discloses a flame retardant additive for thermoplastics which contains a silicone oil, a silicone resin, and a Group IIA metal salt. This flame retardant additive is most effective with the addition of a halogen.

U.S. Pat. No. 4,115,351 discloses synthetic fibers dipped in solutions containing inorganic phosphorus and inorganic nitrogen compounds. To render the compounds more convenient for use in the dip solution, they are coated with inactivating materials including silicone, paraffin, and grease.

U.S. Pat. No. 3,936,416 discloses the use of ammonium polyphosphate and dipentaerythritol as a flame retardant in polypropylene. In addition to insufficient flame retarding effect, there is a problem of flame retardant foaming during melt processing of the polypropylene.

It is an object of the present invention to produce a non-halogen containing flame retardant additive for thermoplastic resin.

It is another object to produce a non-halogen containing flame retardant additive with improved flame retardant effect.

It is yet another object of the present invention to produce a phosphorus and nitrogen containing flame retardant for thermoplastic resins which does not foam during melt processing.

DESCRIPTION OF THE INVENTION

Briefly, there is provided according to the present invention a flame retardant composition comprising:

(A) 100 parts by weight a thermoplastic resin and
(B) from about 2 to about 30 parts by weight a flame retardant additive comprising:
  (i) 20 to 60% by weight a silicone oil,
  (ii) 10 to 40% by weight a silicone resin, and
  (iii) 5 to 60% by weight a gasing agent selected from the group consisting of compounds containing both phosphorus and nitrogen or a mixture of phosphorus containing compounds with nitrogen containing compounds.

Optionally, there may be added a polyhydric alcohol to promote char formation.

A major ingredient contained in the flame retardant additive is approximately 40 to 80 percent by weight of silicone oil. The term "silicone oil" as used herein is generic for a wide range of polysiloxane materials which can be advantageously utilized in the composition of the present invention. For purposes of the present specification it is intended that the expression "silicone oil" be construed as including those effective silicone materials as described by MacLaury and Holub in U.S. Pat. No. 4,273,691, as well as other effective silicone materials, several of which will be described below. Typically, effective silicone will be those silicone fluids or gums which are organopolysiloxane polymers comprised of chemically combined siloxy units typically selected from the group consisting of $R_3SiO_{0.5}$, $R_2SiO$, $R^1SiO_{1.5}$, $R^1R_2SiO_{0.5}$, $RR^1SiO$, $(R^1)_2SiO$, $RSiO_{1.5}$ and $SiO_2$ units and mixtures thereof wherein each R represents independently a saturated or unsaturated monovalent hydrocarbon radical, $R^1$ represents a radial such as R or a radical selected from the group consisting of a hydrogen atom, hydroxyl, alkoxy, aryl, vinyl, or allyl radicals etc. and wherein said organopolysiloxane has a viscosity of approximately 600 to 300,000,000 centipoise at 25° C. A preferred silicone oil is a polydimethylsiloxane having a viscosity of approximately 90,000 to 150,000 centipoise at 25° C. Such effective silicone oils are to be distinguished from the class of materials referred to as silicone resins. Such silicone oils are readily available under a wide variety of brand and grade designations.

Another major ingredient of the flame retardant additive is a class of materials referred to as silicone resin. Silicone resins are well known materials coming in a variety of forms. Approximately 2 to 40 percent by weight of the total additive formulations will be a silicone resin which is soluble in the above described silicone oil (i.e. fluid or gum) and which is effective for imparting improved flame retardancy to the compositions of the present invention. Among the preferred silicone resins are MQ silicone resins. The expression "MQ silicone resin" refers to the fact that such resins are typically comprised primarily of monofunctional M units of the formula $R_3SiO_{0.5}$ and tetrafunctional Q units of the average formula $SiO_2$ having a specified ratio of M to Q units. A notable effective silicone resin for use in the present invention is polytrimethylsilylsilicate which can have a ratio of, approximately, 0.3 to 4.0M units per Q unit. A particularly effective flame retardant additive package might preferably contain from 6 to 30 percent by weight of such MQ resin and have a ratio of, approximately, 0.6 to 2M units per Q units. An example of a commercially available MQ resin is General Electric SR545 (60% MQ resin solids in toluene). A preferred method of utilizing such an MQ resin solution is to mix it with the silicone oil component and thereafter remove the solvent. The solvent can be removed by well known methods, e.g. by distillation at moderate temperatures.

It is contemplated that other silicone soluble forms of solid silicone resins may be effective for use in the flame retardant compositions of the present invention. Indeed, MT and TQ silicone resins (where T represents trifunctional $RSiO_{1.5}$ units) may also be effective as well as mixtures and copolymers of each of the resin mentioned. These silicone resins are well known materials and are readily available. A criteria for suitability is that such effective silicone resinous materials be soluble or dispersible in the silicone oil base.

Additionally, it is to be noted that although the additive composition specifies the silicone oil (essentially D functional) and silicone resin (M, D, T or Q functional) as discrete ingredients to be admixed, it is intended that the present invention encompass reaction products of such materials which may be equally effective as flame retardant additives. It is also foreseeable that a copolymer containing requisite M, D, T or Q functionality may be utilized in place of discrete silicone oil and silicone resin constituents.

The flame retardant additive formulation further contains a gassing agent. Suitable gassing agents are compounds containing both phosphorus and nitrogen or a mixture of phosphorus containing compounds with nitrogen containing compounds. The function of the gassing agent is primarily to produce gas under heat and thereby retard the supply of oxygen. Also, the gassing agent may decrease temperature in addition to forming an extinguishable liquid which is able to cover ignition sites.

Preferred gassing agents are compounds, particularly inorganic compounds containing both phosphorus and nitrogen. Suitable such compounds include ammonium polyphosphates having the general formula $(NH_4)_{n+2}P_nO_{3n+1}$ where n is greater than 2; ammonium phosphates, such as primary ammonium orthophosphate $(NH_4)H_2PO_4$, secondary ammonium orthophosphate $(NH_4)H_2PO_4$, tertiary ammonium orthophosphate $(NH_4)H_3PO_4$, ammonium pyrophosphates such as primary ammonium pyrophosphate $(NH_4)H_3P_2O_7$, secondary ammonium pyrophosphate $(NH_4)_2H_2P_2O_7$, and others like $(NH_4)_3HP_2O_7$, $(NH_4)_4P_2O_7$; ammonium phosphites such as $(NH_4)H_2PO_3$, $(NH_4)_2HPO_3$; ammonium hypophosphates such as $(NH_4)_2H_2P_2O_6$, $(NH_4)_2H_2P_2O_6$, $(NH_4)_3HP_2O_6$; ammonium hypophosphites such as $(NH_4)H_2PO_2$, $(NH_4)_2HPO_2$; ammonium metaphosphate like $(NH_4)PO_3$ and ammonium dihydrogen phosphite $(NH_4)H_2PO_3$ and so forth.

In addition to these examples, compounds with other metal elements are also involved, for example, sodium ammonium phosphate $NaNH_4HPO_4$, magnesium ammonium phosphate $(NH_4)MgPO_4$, ammonium phosphomolybdate $(NH_4)_3PO_4x12MoO_3$, ammonium phosphotungstate $(NH_4)_3PO_4$, 12 $WO_3$, ammonium cobalt phosphate $(NH_4)CoPO_4$, ammonium mangan phosphate $(NH_4)MnPO_4$. Furthermore halogen containing compounds such as difluoroammonium phosphate $(NH_4)PO_2F_2$, hexafluoroammonium phosphate $(NH_4)PF_6$, diaminophospho trichloride $Cl_3P(NH_2)_2$, triphospho nitrilochloride $(PNCl_2)_3$, and other compounds such as phosphoamide $OP(NH_2)_2$, metaphosphimic acid $P_3N_3(OH)_6$ and its ammonium salt $P_3N_3O_6H_3(NH_4)_3$, ammonium trithiophosphate $(NH_4)_3POS_3$. The hydrates of the above compounds are also included.

Further examples of gassing agents containing both nitrogen and phosphorous are nitrogen containing pentate salts, melamine pyrophosphate, phosphine oxide, etc. Nitrogen containing pentate salts are further described in U.S. Pat. No. 4,154,930, hereby incorporated by reference.

As stated above, the gassing agent can also be a mixture of phosphorous containing compounds with nitrogen containing compounds. Phosphorus containing compounds include phosphoric acid, phosphorous acid, metaphosphoric acid, metaphosphorous acid, hypophosphorous acid, pyrophosphorous acid, hypophosphoric acid, pyrophosphoric acid and preferably salts thereof. The salts include, for example, sodium salt, potassium salt, lithium salt, beryllium salt, magnesium salt, calcium salt, zinc salt, cadmium salt, ammonium salt and so on.

The phosphorus containing compounds are exemplified by potassium dihydrogen phosphate $KH_2PO_4$, dipotassium hydrogen phosphite $K_2HPO_3$, potassium pyrophosphate $K_4P_2O_7$, magnesium pyrophosphate $Mg_2P_2O_7$, potassium metaphosphate $(KPO_3)n$, sodium potassium hydrogen phosphate $NaKHPO_4x7H_2O$ disodium dihydrogen pyrophosphate $Na_2H_2P_2O_7$, sodium metaphosphate $(NaPO_3)_6$ disodium dihydrogen hypophosphate $Na_2H_2P_2O_6$, trisodium phosphate $Na_3PO_4x12H_2O$, disodium hydrogen phosphite $Na_2HPO_3x5H_2O$, disodium phosphomolybdate $Na_2PO_4x12MoO_3$, trilithium phosphate $Li_3PO_4x\frac{1}{2}H_2O$, magnesium hydrogen phosphate $MgHPO_4x3H_2O$, disodium hydrogen phosphate $Na_2HPO_4$ and its hydrates $Na_2HPO_4x2H_2O$, $Na_2HPO_4x7H_2O$, $Na_2HPO_4x12H_2O$, sodium dihydrogen phosphate $NaH_2PO_4xH_2O$, primary monomagnesium hydrogen phosphate $MgH_4(PO_4)_2x3H_2O$, trimagnesium phosphate $Mg_3(PO_4)_2x5H_2O$, secondary calcium phosphate $CaHPO_4x2H_2O$, primary calcium hydrogen phosphate $CaH_4(PO_4)_2$, calcium phosphate $CaHPO_3$, tertiary zinc phosphate $Zn_3(PO_4)_2x4H_2O$, secondary zinc phosphite $ZnHPO_3$, zinc pyrophosphate $Zn_2P_2O_7$, aluminum phosphate $AlPO_4$, and so forth.

Nitrogen containing compounds are readily available and are preferably ammonium compounds. Suitable ammonium compounds are ammonium chloride, ammonium carbonate, ammonium hydrogen carbonate, ammonium nitrate, ammonium sulfate, ammonium hydrogen sulfate, ammonium phosphates.

Of course, two or more phosphorus containing compounds may be mixed with two or more nitrogen containing compounds. Persons skilled in the art can determine the relative ratios of phosphorus compounds and nitrogen compounds necessary to achieve the effect as a gassing agent. Such ratio will obviously change depending on the particular compounds employed.

An optional but preferred ingredient of the flame retardant additive formulation is a polyhydric alcohol.

The polyhydric alcohols useful for the purposes of this invention are acyclic and cyclic compounds having a plurality of hydroxyl groups attached thereto, and include, for example, pentaerythritol, dipentaerythritol, tripentaerythritol, pentitols such as adonitol, arabitol and the like, hexitols such as dulcitol, inositol and the like, and saccharides such as amylose, xylan and the like, as well as such derivatives thereof as N-methyl glucamine. The function of the polyhydric alcohol appears to be that of acting as an additional carbonific or carbon source for the gassing agent thereby increasing the amount of char formation and reducing the amount of gassing agent additive required to effect useful flame retardant behavior. The amount of polyhydric alcohol employed will thus necessarily be selected in proportion to the amount of the gassing agent used, and in general the weight ratio of gassing agent to polyhydric alcohol will be from about 9:1 to about 5:1. Where lesser amounts of polyhydric alcohol are employed such that the ratio is greater than about 10:1, the improvement in char formation becomes negligible, while the use of greater amounts of polyhydric alcohol, ie. where the ratio is less than about 4:1, tends to reduce the flame retardant effect by way of supplying the unneeded excess polyhydric alcohol as a fuel to the flame.

Thermoplastic resins in which the flame retardant additive formulation described herein is useful include blowable, extrudable, and injection moldable thermoplastic resins. Specifically, these resins include polyolefins such as polyethylene, polypropylene, polystyrene, PVC, polybutadiene, etc.; polycarbonate; polyamide; polyester, including poly(ethylene terephthalate), poly(butylene terephthalate), poly(cyclohexanedimethanol terephthalate), etc.; poly(phenylene oxide); polyimide; polyacrylate; polyether; epoxy; etc. An aspect of the present invention is particularly advantageous for thermoplastics having a melt temperature greater than about 150° C.

It is preferred that for each 100 parts by weight of thermoplastic resin, there be added from about 2 to about 30 parts by weight flame retardant additive. More preferably there should be added from about 10 to about 25 parts by weight flame retardant additive for each 100 parts by weight thermoplastic resin.

The flame retardant additive, as stated above, must contain silicone oil, silicone resin, gassing agent and optionally polyhydric alcohol. Based on silicone oil, silicone resin, and gassing agent content, the flame retardant additive should contain from about 20 to about 60% by weight silicone oil, from about 10 to about 40% by weight silicone resin, and from about 20 to about 60% by weight gassing agent. Preferably, these constituents in the flame retardant additive should range from about 30 to about 50% by weight silicone oil, from about 15 to about 30% by weight silicone resin and from about 30 to about 50% by weight gassing agent.

In the practice of the present invention the flame retarded compositions can be made by mixing together the thermoplastic resin with the silicone oil, the silicone resin, and the gassing agent by means of any conventional coompounding or blending apparatus, including a roll mill, a Banbury mixer, or an extruder. The order of addition of the particular constituents does not appear to be critical; and those skilled in the art will be able to optimize mixing operations to fit their particular need.

A preferred method of providing the flame retardant thermoplastic compositions of the present invention is to premix the silicone oil with the MQ resin solution, and thereafter remove the solvent as by distillation. This will insure complete dispersion of the resin in the oil. This solution is thereafter combined with the remaining ingredients by any suitable means for providing a homogeneous composition (e.g. twin screw extrusion).

Preferably all the ingredients are formulated together at as low a temperature as possible recognizing, of course, that the temperature must be at least the melt temperature of the thermoplastic resin. The gassing agent is sensitive to heat and will foam the thermoplastic if melt temperature is excessive. Although it is one aspect of the present invention that foaming is reduced, lower formulations temperatures are beneficial to further reduce foaming. Depending on the particular thermoplastic resin and gassing agent employed, the temperature of extrusion may vary between about 250° F. and about 600° F.

The flame retarded thermoplastic resin may be molded, extruded, compressed or spun, etc. to form numerous useful products. These products include coatings, injection molded items, sheet, webbing, fibers and other products. End use may be in conductive wire, appliance housings, hair dryers, automotive interiors, fans, motors, pump housings, power tools, electronic housings, etc. Persons skilled in the art can easily imagine others.

EXAMPLES

In order that those skilled in the art will be better able to practice the invention, the following examples are given by way of illustration and not by way of limitation. All parts are in parts by weight.

EXAMPLES 1-5

Polypropylene (Hercules Pro-fax 6523 resin), was blended above melt temperature with the materials shown in Table I on a Banbury compounder. The resultant material was comminuted into pellets and injection molded at about 380° F. into UL94 test bars.

TABLE I

|  | 1 | 2 | 3 | 4 | 5 |
|---|---|---|---|---|---|
| Polypropylene | 74.3 | 78.5 | 70.8 | 72.8 | 72.8 |
| Magnesium Stearate | 4.4 | 3.6 | — | — | — |
| Silicone Oil [1] | 6.3 | 7.1 | 4.7 | 5.2 | 4.8 |
| Silicone Resin [2] | 3.2 | 3.6 | 2.4 | 2.6 | 2.4 |
| Decabromodiphenyloxide | 6.9 | — | — | — | — |
| Talc | 5.0 | 7.2 | — | — | — |
| Ammonium Polyphosphate [3] | — | — | 19.7 | 14.6 | 14.5 |
| Pentaerythritol [4] | — | — | 4.4 | 4.9 | 5.5 |
| UL-94 | V-1 | V-1 | V-0 | V-1 | V-0 |

[1] Silanol stopped polydimethylsiloxane polymer, nominal viscosity is 90,000–150,000 centipoise
[2] MQ silicone resin, M/Q ratio approximately 0.8/1
[3] $(NH_4)_{n+2} PnO_{3n+1}$ where n = 1000 to 3000, Monsanto Company
[4] Pentaerythritol

EXAMPLES 7 AND 8

Polypropylene, (Hercules Pro-fax 6523 resin), was melt extruded and cooled in a water bath with materials shown inn Table II. The resultant extrudate was comminuted into pellets and injection at about 380° F. into UL-94 test plaques.

TABLE II

|  | 6 | 7 |
|---|---|---|
| Polypropylene | 72.8 | 72.8 |
| Silicone Oil | 4.8 | — |
| Silicone Resin | 2.4 | — |
| Ammonium Polyphosphate | 14.5 | 14.5 |
| Pentaerythritol | 5.5 | 5.5 |
| Visual Inspection of Exudate | slight foam | heavy foam, pitted surface consumed |
| UL-94 | V-1 |  |

What is claimed is:

1. A flame retarded composition comprising:
   (A) 100 parts by weight a thermoplastic resin and
   (B) from about 2 to about 30 parts by weight a flame retardant additive comprising:
   (i) 20 to 60% by weight of a silicone oil;
   (ii) 10 to 40% by weight a silicone resin;
   (iii) 5 to 60% by weight a gassing agent selected from the group consisting of compounds containing both phosphorus and nitrogen or a mixture of phosphorus containing compounds with nitrogen containing compounds; and (iv) a polyhydric alcohol in a weight ratio to said gassing agent ranging from about 1/9 to about 1/2.6.

2. The composition of claim 1 wherein said thermoplastic resin is polyolefin.

3. The composition of claim 1 wherein said silicone oil is an essentially linear polydimethylsiloxane polymer having a viscosity between about 90,000 and 150,000 centipoise at 25° C.

4. The composition of claim 1 wherein said silicone resin is an MQ resin comprised of monofunctional M units of the average formula $R_3SiO_{0.5}$ and tetrafunctional Q units of the average formula $SiO_2$, and having an average ratio of, approximately, 0.3 to 4.0M units per Q unit.

5. The composition of claim 1 wherein said gassing agent is a compound containing both phosphorus and nitrogen.

6. The composition of claim 5 wherein said gassing agent is selected from the group consisting of ammonium polyphosphates, ammonium phosphates, ammonium pyrophosphates, ammonium phosphites, ammonium hypophosphates, ammonium hypophosphites, ammonium metaphosphates, ammonium dihydrogen phosphites.

7. The composition of claim 1 wherein said gassing agent is a mixture of phosphorus containing compounds and nitrogen containing compounds.

8. The composition of claim 1 wherein said flame retardant additive is present in an amount ranging from about 10 to about 25 parts by weight per 100 parts by weight thermoplastic resin.

9. The composition of claim 2 wherein said polyhydric alcohol is selected from the group consisting of pentaerythritol, dipentaerythritol, tripentaerythritol, pentitols, hexitols, and saccharides.

10. A flame retardant additive comprising:
   (i) 20 to 60% by weight a silicone oil;
   (ii) 10 to 40% by weight a silicone resin;
   (iii) 5 to 60% by weight a gassing agent selected from the group consisting of compounds containing both phosphorus and nitrogen or a mixture of phosphorus containing compounds with nitrogen containing compounds; and
   (iv) a polyhydric alcohol in a weight ratio to said gassing agent ranging from about 1/9 to about 1/2.6.

11. The composition of claim 10 wherein said silicone oil is an essentially linear polydimethylsiloxane polymer having a viscosity between about 90,000 and 150,000 centipoise at 25° C.

12. The composition of claim 10 wherein said silicone resin is an MQ resin comprised of monofunctional M units of the average formula $R_3SiO_{0.5}$ and tetrafunctional Q units of the average formula $SiO_2$, and having an average ratio of, approximately, 0.3 to 4.0M units per Q unit.

13. The composition of claim 10 wherein said gassing agent is a compound containing both phosphorus and nitrogen.

14. The composition of claim 13 wherein said gassing agent is selected from the group consisting of ammonium polyphosphates, ammonium phosphates, ammonium pyrophosphates, ammonium phosphites, ammonium hypophosphates, ammonium hypophosphites, ammonium metaphosphates, ammonium dihydrogen phosphites.

15. The composition of claim 10 wherein said gassing agent is a mixture of phosphorus containing compounds and nitrogen containing compounds.

16. The composition of claim 11 wherein said polyhydric alcohol is selected from the group consisting of pentaerythritol, dipentaerythritol, tripentaerythritol, pentitols, hexitols, and saccharides.

17. A process for flame retarding thermoplastic resin comprising the step of
   (A) melt blending with said thermoplastic resin a flame retardant additive comprising:
   (i) 20 to 60% by weight a silicone oil;
   (ii) 10 to 40% by weight a silicone resin;
   (iii) 5 to 60% by weight a gassing agent selected from the group consisting of compounds containing both phosphorus and nitrogen or a mixture of phosphorus containing compounds with nitrogen containing compounds; and
   (iv) a polyhydric alcohol in a weight ratio to said gassing agent ranging from about 1/9 to 1/2.6.

18. The process of claim 17 wherein said melt temperature is between about 250° F. and 600° F.

19. The process of claim 17 wherein said silicone oil is an essentially linear polydimethylsiloxane polymer having a viscosity between about 90,000 and 150,000 centipoise at 25° C.

20. The process of claim 17 wherein said silicone resin is an MQ resin comprised of monofunctional M units of the average formula $R_3SiO_{0.5}$ and tetrafunctional Q units of the average formula $SiO_2$, and having an average ratio of, approximately, 0.3 to 4.0M units per Q unit.

21. The process of claim 17 wherein said gassing agent is a compound containing both phosphorus and nitrogen.

22. The process of claim 21 wherein said gassing agent is selected from the group consisting of ammonium polyphosphates, ammonium phosphates, ammonium pyrophosphates, ammonium phosphites, ammonium hypophosphates, ammonium hypophosphites, ammonium metaphosphates, ammonium dihydrogen phosphites.

23. The process of claim 17 wherein said gassing agent is a mixture of phosphorus containing compounds and nitrogen containing compounds.

24. The process of claim 20 wherein said polyhydric alcohol is selected from the group consisting of pentaerythritol, dipentaerythritol, tripentaerythritol, pentitols, hexitols, and saccharides.

* * * * *

UNITED STATES PATENT AND TRADEMARK OFFICE
CERTIFICATE OF CORRECTION

PATENT NO. : 4,871,795
DATED : 10/03/89
INVENTOR(S) : P. K. Pawar

It is certified that error appears in the above-identified patent and that said Letters Patent is hereby corrected as shown below:

Title page:

(73) Assignee: General Electric Company

Signed and Sealed this

Seventh Day of August, 1990

*Attest:*

HARRY F. MANBECK, JR.

*Attesting Officer*   *Commissioner of Patents and Trademarks*